(12) United States Patent
Tamaki (10) Patent No.: US 12,432,232 B2
(45) Date of Patent: Sep. 30, 2025

(54) INFORMATION PROCESSING APPARATUS, INFORMATION PROCESSING METHOD, AND STORAGE MEDIUM FOR PROCESSING REGISTRATION REQUESTS

(71) Applicant: CANON KABUSHIKI KAISHA, Tokyo (JP)

(72) Inventor: Wataru Tamaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 18/529,879

(22) Filed: Dec. 5, 2023

(65) Prior Publication Data

US 2024/0195823 A1    Jun. 13, 2024

(30) Foreign Application Priority Data

Dec. 12, 2022    (JP) ................. 2022-197983

(51) Int. Cl.
     *H04L 9/40*      (2022.01)

(52) U.S. Cl.
     CPC ......... *H04L 63/1416* (2013.01); *H04L 63/12* (2013.01)

(58) Field of Classification Search
     None
     See application file for complete search history.

(56) References Cited

U.S. PATENT DOCUMENTS

| | | | | |
|---|---|---|---|---|
| 9,800,589 | B1* | 10/2017 | Asveren | H04L 63/1408 |
| 10,542,001 | B1* | 1/2020 | Leung | H04L 63/1441 |
| 11,044,604 | B2* | 6/2021 | Talmor | H04L 9/083 |
| 11,329,998 | B1* | 5/2022 | Shahidzadeh | G06F 21/57 |
| 2005/0159157 | A1* | 7/2005 | Bajko | H04W 12/06 455/411 |
| 2008/0103798 | A1* | 5/2008 | Domenikos | G06Q 40/08 705/318 |
| 2008/0263661 | A1* | 10/2008 | Bouzida | H04L 63/1416 726/22 |
| 2019/0238569 | A1* | 8/2019 | Nandy | H04L 63/0227 |
| 2020/0007466 | A1* | 1/2020 | Tsiatsikas | H04L 63/102 |

(Continued)

FOREIGN PATENT DOCUMENTS

JP      2004192193 A      7/2004

*Primary Examiner* — Bassam A Noaman
(74) *Attorney, Agent, or Firm* — Canon U.S.A., Inc. IP Division (57) ABSTRACT

When receiving a registration request for a user, an information processing apparatus transmits an e-mail including an authentication uniform resource locator (URL) to an e-mail address included in the registration request. The apparatus receives an authentication request for the e-mail address that is transmitted by access to the URL. The apparatus determines whether the registration request is under attack. If the registration request is determined to be under attack, the apparatus performs control to request a transmitter of the authentication request to perform an operation to confirm whether the transmitter has made the registration request. If the registration request is determined to be not under attack, the apparatus performs control not to request the confirmation operation. The apparatus then authenticates the e-mail address corresponding to the authentication request and registers the user. If the confirmation operation is requested, the apparatus does not register the user based on the confirmation operation.

10 Claims, 10 Drawing Sheets

(56) References Cited

U.S. PATENT DOCUMENTS

| | | | | |
|---|---|---|---|---|
| 2020/0403992 A1* | 12/2020 | Huffman | ............... | H04L 63/083 |
| 2022/0006823 A1* | 1/2022 | Tse | ...................... | H04L 63/1416 |
| 2024/0305611 A1* | 9/2024 | Chiang | ................... | G06F 16/95 |

* cited by examiner

| USER ID | PASSWORD | E-MAIL ADDRESS | USER NAME | PROVISIONAL REGISTRATION ID | REGISTRATION REQUEST DATE AND TIME | | IP ADDRESS | BROWSER |
|---|---|---|---|---|---|---|---|---|
| AAA | passA | aaa@test.com | UserA | | 2022/9/20 | 17:21:30 | 10.22.33.44 | Edge |
| BBB | passB | bbb@test.com | UserB | | 2022/9/20 | 23:15:34 | 10.33.44.55 | Firefox |
| CCC | passB | ccc@test.com | UserC | tmpCCC | 2022/9/21 | 14:48:50 | 10.11.22.33 | Chrome |

INFORMATION PROCESSING APPARATUS, INFORMATION PROCESSING METHOD, AND STORAGE MEDIUM FOR PROCESSING REGISTRATION REQUESTS

BACKGROUND

Field

The present disclosure relates to a user registration technique.

Description of the Related Art

In recent years, various services have become available through connection to the Internet.

When starting to use any of these services, a user makes a registration request by entering information such as the user's name and e-mail address. To verify the validity of the e-mail address entered at this time, it is common to transmit an identity verification e-mail to the e-mail address. Japanese Patent Application Laid-Open No. 2004-192193 discusses a technique for verifying the validity of an e-mail address, by which an identity verification e-mail including a link for authentication is transmitted to the e-mail address and the recipient of the e-mail opens the link. When the validity of the e-mail address is verified, the user is officially registered with the service.

Meanwhile, there are attackers who make a user registration request using an e-mail address obtained in some way. Under such an attack, if the owner of the e-mail address opens the link in the identity verification e-mail by mistake, the user is officially registered with the service, so that the attacker can pretend to be the owner of the e-mail address and use the service.

SUMMARY

The present disclosure is directed to reducing the risk of false user registration in a system in which user registration is made using an e-mail address.

According to an aspect of the present disclosure, an information processing apparatus includes a first reception unit configured to receive a registration request for a user, a transmission unit configured to transmit an e-mail including an authentication uniform resource locator (URL) to an e-mail address included in the registration request, a second reception unit configured to receive an authentication request for the e-mail address, the authentication request being transmitted by access to the authentication URL, an attack determination unit configured to determine whether the registration request received by the first reception unit is under attack, a request control unit configured to, in a case where the attack determination unit determines that the registration request received by the first reception unit is under attack, perform control to request a transmitter of the authentication request received by the second reception unit to perform a confirmation operation to confirm whether the transmitter has made the registration request and, in a case where the attack determination unit determines that the registration request received by the first reception unit is not under attack, perform control not to request the confirmation operation, and a registration unit configured to authenticate the e-mail address corresponding to the authentication request received by the second reception unit and register the user corresponding to the registration request including the e-mail address. In a case where the request control unit requests the confirmation operation, the registration unit does not register the user based on a result of the confirmation operation.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings.

Configurations illustrated in the following exemplary embodiments are merely examples, and the present disclosure is not limited to the illustrated configurations.

Figure 1:
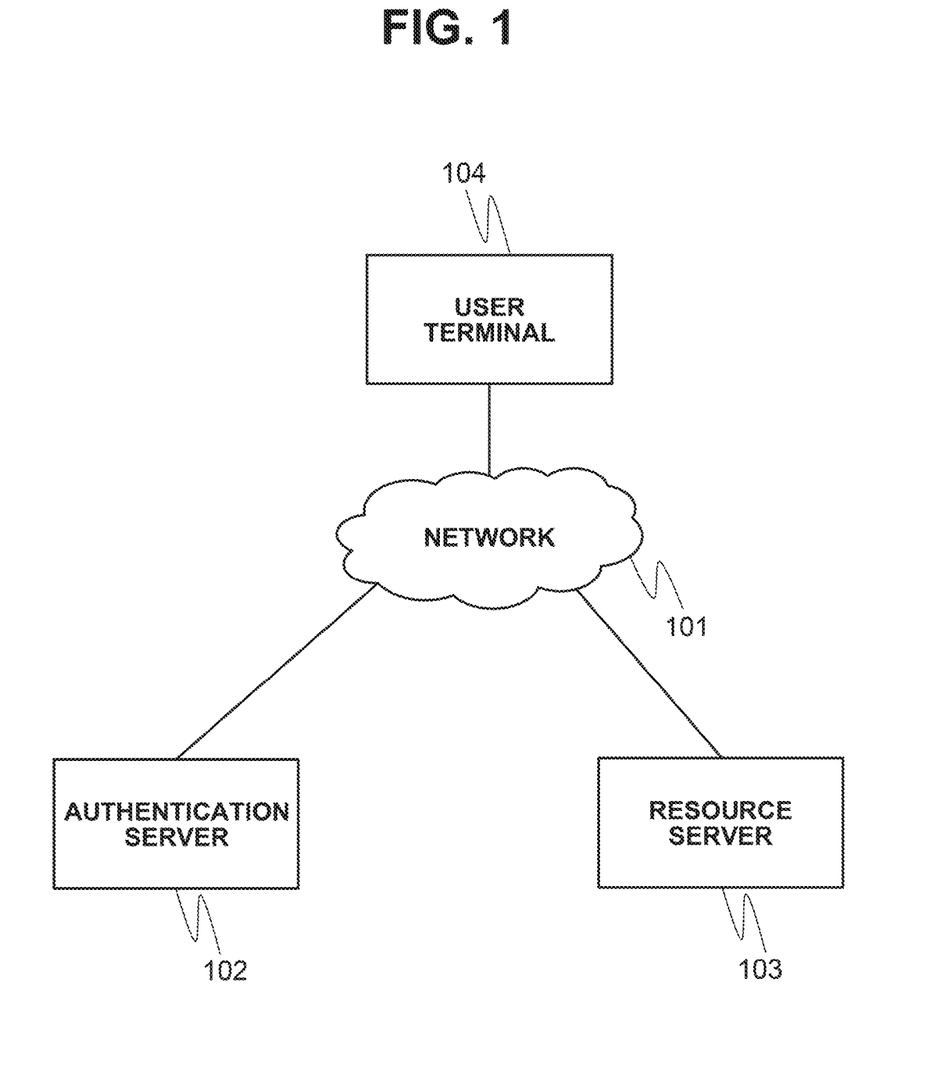
FIG. 1 is a diagram illustrating an example of a configuration of an authentication system according to a first exemplary embodiment.

FIG. 1 is a schematic diagram illustrating an example of a configuration of an authentication system according to a first exemplary embodiment. The authentication system includes an authentication server 102, a resource server 103, and a user terminal 104.

The authentication server 102, the resource server 103, and the user terminal 104 are communicably connected to each other via a network 101.

The authentication server 102 performs user authentication. The authentication server 102 receives a user authentication request from the user terminal 104. The authentication request includes authentication information. In the present exemplary embodiment, a user identification (ID) and identity verification information such as a password will be referred to as authentication information. The authentication server 102 authenticates a user by verifying the authentication information of the user against user information registered in the authentication server 102. The authentication server 102 is an example of an information processing apparatus that receives a user registration request from the user terminal 104 and registers the user based on the received registration request. Characteristic processing in the present exemplary embodiment is mainly performed by the authentication server 102.

The resource server 103 possesses resources. In the present exemplary embodiment, the resources refer to all types of data and processes available via the network 101 (the Internet). The user terminal 104 can use the resources provided by the resource server 103 only if the user authentication by the authentication server 102 succeeds.

The user terminal 104 is a personal computer (PC), a mobile terminal, or the like. The user terminal 104 transmits a user registration request or a user authentication request to the authentication server 102.

FIG. 1 illustrates an example of a configuration of the authentication system according to the present exemplary embodiment. The functions of the server apparatuses included in the authentication system may be distributed and arranged in different computers, or may converge into the same computer. For example, the authentication server 102 and the resource server 103 may be included in the same computer. The server apparatuses are not limited to physical server apparatuses and may be virtual server apparatuses.

Figure 2:
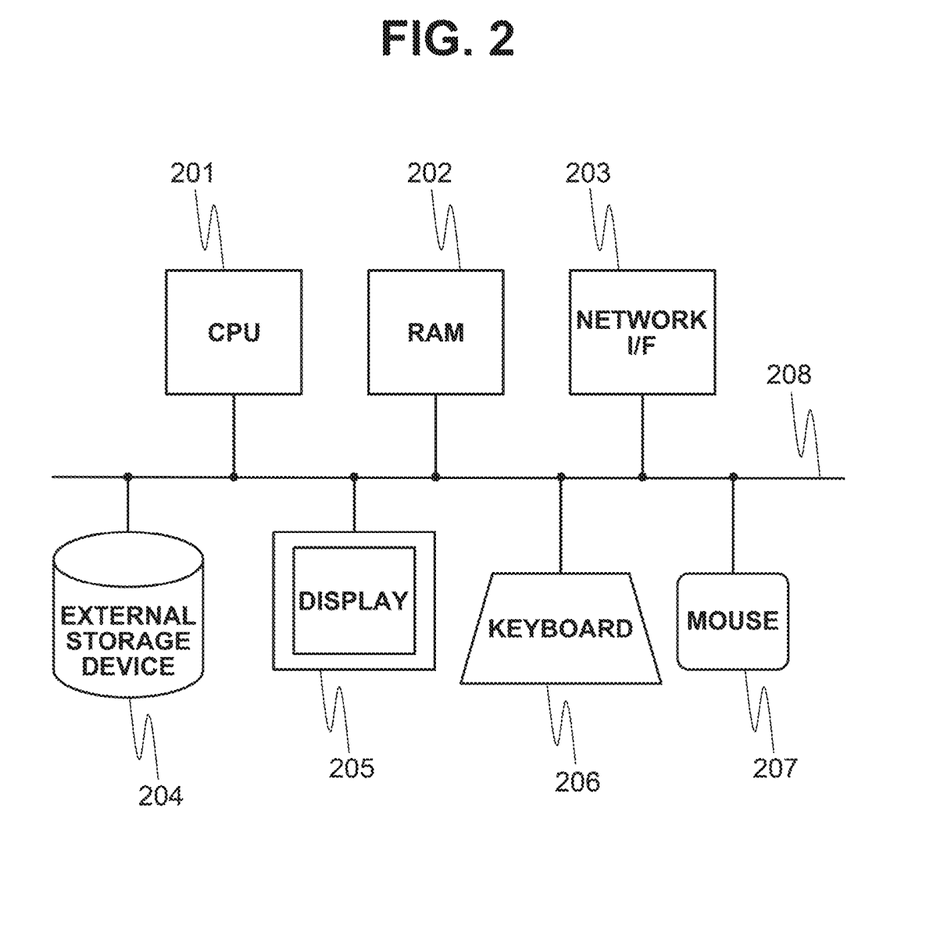
FIG. 2 is a block diagram illustrating an example of a hardware configuration of an authentication server according to the first exemplary embodiment.

FIG. 2 is a block diagram illustrating an example of a hardware configuration of the authentication server 102 according to the present exemplary embodiment. Each of the resource server 103 and the user terminal 104 can be implemented by a hardware configuration similar to that of the authentication server 102. The authentication server 102, the resource server 103, and the user terminal 104 may not necessarily have the same configuration.

The authentication server 102 includes a central processing unit (CPU) 201, a random access memory (RAM) 202, a network interface (I/F) 203, an external storage device 204, a display 205, a keyboard 206, and a mouse 207. These components are connected to each other via a bus 208.

The CPU 201 controls the entire operation of the authentication server 102. The CPU 201 executes programs stored in the external storage device 204 or the like, thereby implementing various functions of the authentication server 102 and processing in the flowcharts to be described below. The RAM 202 is a volatile memory that temporarily stores data to be used, and functions as a work area that is used by the CPU 201 to load data when executing programs.

The network I/F 203 connects to the network 101 under control of the CPU 201 to transmit and receive data to and from other apparatuses on the network 101. The external storage device 204 is a non-volatile memory such as a magnetic disk or a flash memory and stores programs and various types of information. The display 205 is an example of a display unit that displays processing results and the like under control of the CPU 201. The keyboard 206 and the mouse 207 are examples of an input unit that outputs, to the CPU 201, input information based on a user's input operation. The user can perform an input operation using the keyboard 206 and the mouse 207 on the displayed contents on the display 205. The input unit may be a touch panel.

Figure 3:
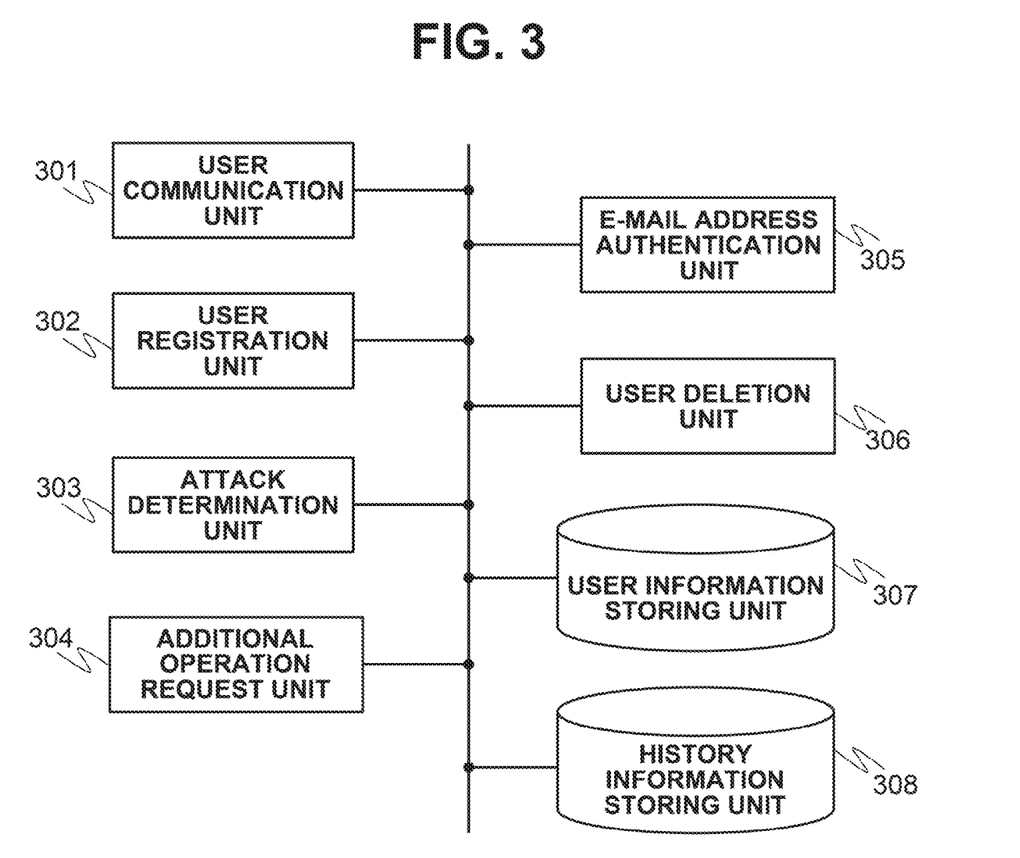
FIG. 3 is a block diagram illustrating an example of a functional configuration of the authentication server according to the first exemplary embodiment.

FIG. 3 is a block diagram illustrating an example of a functional configuration of the authentication server 102 according to the present exemplary embodiment. The CPU 201 executes programs stored in the external storage device 204 or the like, whereby the authentication server 102 functions as a user communication unit 301, a user registration unit 302, an attack determination unit 303, an additional operation request unit 304, an e-mail address authentication unit 305, and a user deletion unit 306. The authentication server 102 also secures a storage area for storing a user information storing unit 307 and a history information storing unit 308, in the external storage device 204 or the like.

The user communication unit 301 communicates with the user terminal 104 to exchange various kinds of information with the user terminal 104. The user communication unit 301 receives a user registration request from the user terminal 104. If the received registration request is a request to register an unregistered user, an e-mail address included in the registration request is registered in the user information storing unit 307, as information of the user in a provisionally registered state. The user communication unit 301 then transmits an identity verification e-mail to the e-mail address of the user in the provisionally registered state. The identity verification e-mail includes a uniform resource locator (URL) including information (a provisional registration ID) with which the user in the provisionally registered state can be uniquely identified. The user terminal 104 accesses the URL in response to the recipient of the identity verification e-mail performing an operation of clicking or touching the URL.

The user terminal 104 transmits an e-mail address authentication request by accessing the URL. The user communication unit 301 receives the e-mail address authentication request from the user terminal 104.

The user registration unit 302 registers the user in response to the user registration request received by the user communication unit 301. If the registration request received by the user communication unit 301 is a request to register an unregistered user, the user registration unit 302 registers the e-mail address included in the registration request into the user information storing unit 307, as the information of the user in the provisionally registered state. Then, if the e-mail address is authenticated by the e-mail address authentication unit 305, the user registration unit 302 newly registers the user corresponding to the e-mail address.

The attack determination unit 303 determines whether an attack occurs on a user registration request that is made to the authentication system. In the present exemplary embodiment, the attack determination unit 303 determines whether a user registration request is under attack. In the present exemplary embodiment, the attack refers to a situation where an attacker makes user registration requests using an e-mail address list obtained in some way. In general, a user registration request is made to register a new user, and thus the registration of an unregistered user is requested. The frequency of making a registration request for an existing user (an already registered user) is low because the request is made in a rare case where, for example, the user has forgotten about the registration made in the past. On the other hand, if an attacker makes registration requests using an obtained e-mail address list, the attacker does not know in advance whether the users have already been registered in the authentication system and thus the registration requests from the attacker include a certain number of registration requests for existing users. To address this, in the present exemplary embodiment, if an increase in the proportion of registration requests for existing users is detected, the attack determination unit 303 determines that the attack occurs.

If the attack determination unit 303 determines that the attack occurs, the additional operation request unit 304 requests the recipient of the identity verification e-mail to perform a confirmation operation to confirm whether the recipient himself or herself has made the registration request, in addition to the operation of clicking or touching the URL in the identity verification e-mail.

Upon receipt of the e-mail address authentication request by the user communication unit 301, the e-mail address authentication unit 305 authenticates the e-mail address.

If a user deletion request is returned as a result of the confirmation operation requested by the additional operation request unit 304, the user deletion unit 306 deletes, from the user information storing unit 307, the information of the user in the provisionally registered state.

Figure 4:
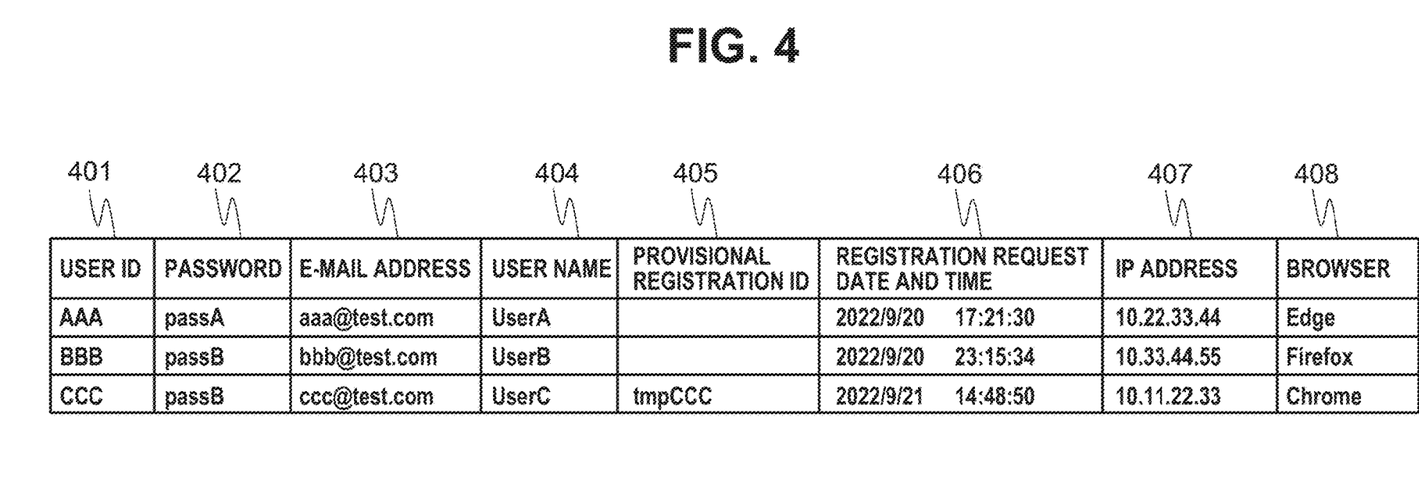
FIG. 4 is a diagram illustrating information stored in a user information storing unit according to the first exemplary embodiment.

FIG. 4 illustrates information stored in the user information storing unit 307. The user information storing unit 307 is a data table that stores the information included in the user registration request. A user ID field 401 stores user IDs with which users can be uniquely identified in the authentication system. A password field 402 stores the users' passwords. An e-mail address field 403 stores the users' e-mail addresses.

A user name field 404 stores the users' registration names.

A provisional registration ID field 405 stores the provisional registration IDs of the users if applicable. The record in which a value of the provisional registration ID is stored indicates that the user is in the provisionally registered state. A registration request date and time field 406 stores the dates and times when the user registration requests are received. An IP address field 407 stores the IP addresses of the user terminals 104 that are the transmitters of the user registration requests. A browser field 408 stores the types of browsers on the user terminals 104 that are the transmitters of the user registration requests. The user information storing unit 307 stores the records each including the user ID, the password, the e-mail address, the user name, the registration request date and time, the IP address, and the type of browser. The provisional registration IDs are included only in the records in the provisionally registered state.

Figure 5:
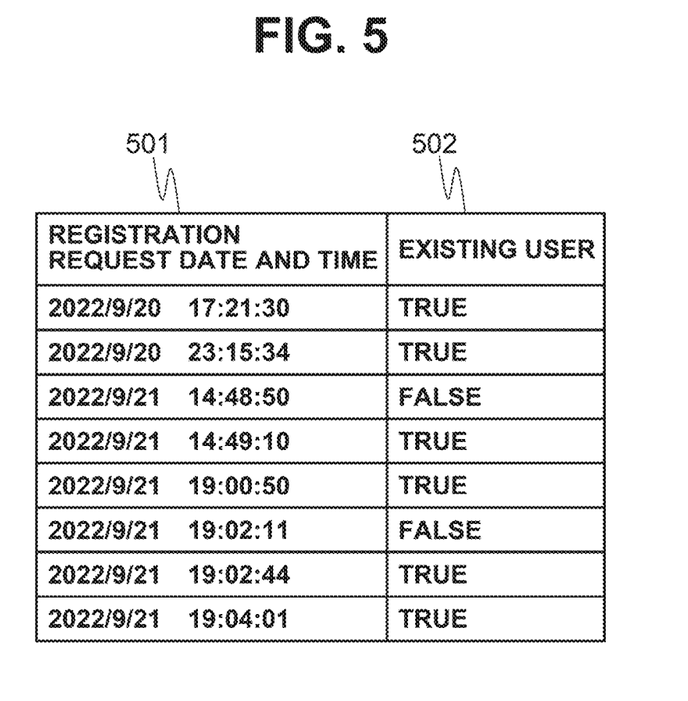
FIG. 5 is a diagram illustrating information stored in a history information storing unit according to the first exemplary embodiment.

FIG. 5 illustrates information stored in the history information storing unit 308. The history information storing unit 308 is a data table that stores history information about the received user registration requests. A registration request date and time field 501 stores the dates and times when the user registration requests are received. An existing user field 502 stores information indicating whether the users corresponding to the registration requests are existing users (previously registered users) or unregistered users. In the case of an existing user, the value "TRUE" is stored in the existing user field 502. In the case of an unregistered user, the value "FALSE" is stored in the existing user field 502. Each time a user registration request is received, a record is added to and stored in the history information storing unit 308.

Figure 6:
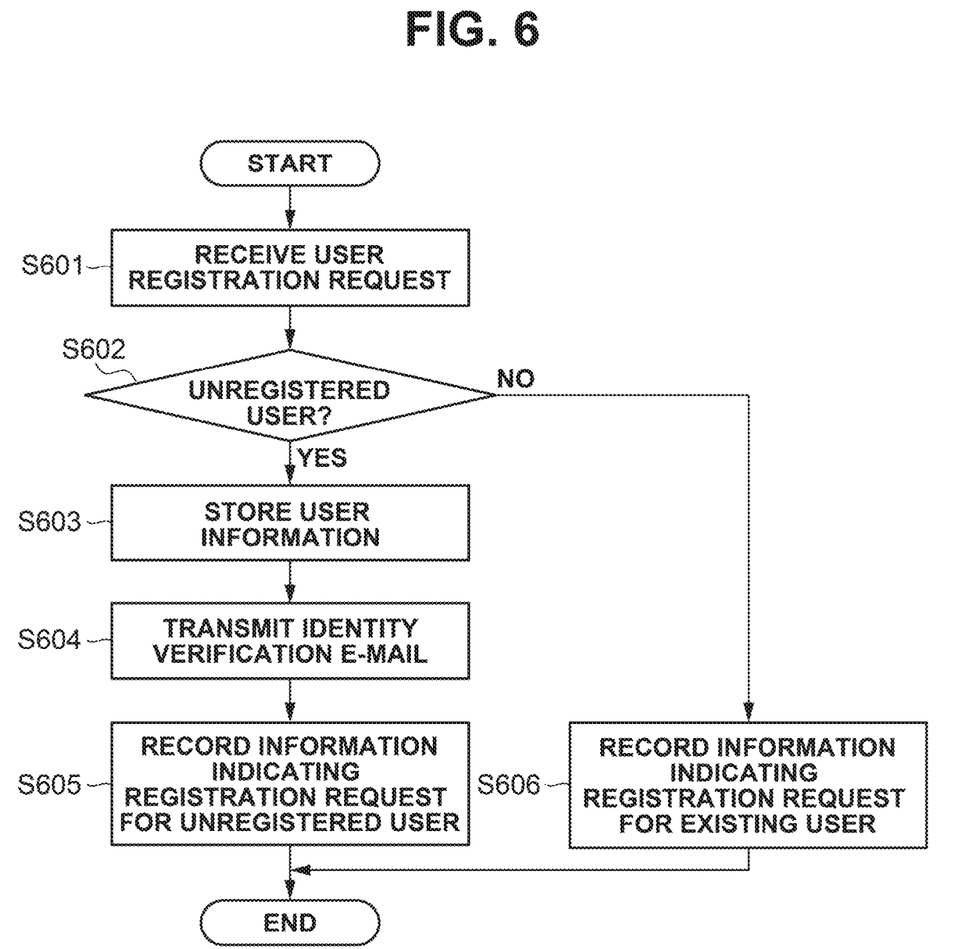
FIG. 6 is a flowchart illustrating processing performed by the authentication server according to the first exemplary embodiment.

FIG. 6 is a flowchart illustrating processing performed by the authentication server 102 according to the present exemplary embodiment in the case of receiving a user registration request.

In step S601, the CPU 201 receives a user registration request from the user terminal 104.

The user registration request received at this time includes information such as a user name, an e-mail address, and a password. The CPU 201 also acquires the IP address of the user terminal 104, which is the transmitter of the user registration request, and the type of browser on the user terminal 104.

In step S602, the CPU 201 determines whether the user registration request received in step S601 is a request to register an unregistered user. More specifically, the CPU 201 searches the records stored in the user information storing unit 307 to find a record including the e-mail address received in step S601. As a result of the search, if there is no record including the e-mail address, the CPU 201 determines that the user registration request is a request to register an unregistered user. If there is a record including the e-mail address and it is found that the user in the record is the same as the user of which registration is requested, the CPU 201 determines that the user registration request is a request to register an existing user. If the CPU 201 determines that the user registration request is a request to register an unregistered user (YES in step S602), the processing proceeds to step S603. If the CPU 201 determines that the user registration request is a request to register an existing user (NO in step S602), the processing proceeds to step S606.

In step S603, the CPU 201 stores the information received and acquired in step S601 into the user information storing unit 307. The user ID field 401 and the provisional registration ID field 405 respectively store generated unique values. The password field 402, the e-mail address field 403, the user name field 404, the IP address field 407, and the browser field 408 respectively stores the corresponding information received or acquired in step S601. The registration request date and time field 406 stores the current date and time. In this manner, the CPU 201 provisionally registers the information of the user in response to the user registration request received in step S601.

Figure 8A:
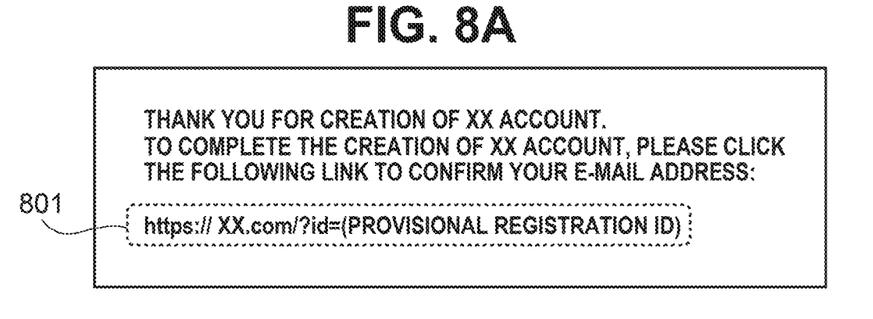
FIGS. 8A to 8C are diagrams each illustrating an example of a screen displayed on a user terminal according to the first exemplary embodiment.

In step S604, the CPU 201 transmits an identity verification e-mail to the e-mail address received in step S601. FIG. 8A illustrates an example of the identity verification e-mail transmitted in step S604.

The identity verification e-mail illustrated in FIG. 8A is displayed on the display 205 of the user terminal 104. The CPU 201 generates an URL 801 including the provisional registration ID generated in step S603 and the address of the authentication server 102, and includes the URL 801 into the identity verification e-mail. The user terminal 104 transmits an e-mail address authentication request to the authentication server 102 in response to the operation of clicking or touching the URL 801 in the identity verification e-mail. The URL 801 is an example of an authentication URL.

In step S605, the CPU 201 records information indicating the receipt of the registration request for the unregistered user, into the history information storing unit 308. The registration request date and time field 501 stores the current date and time. The existing user field 502 stores the value "FALSE". The processing in the flowchart is then ended.

In step S606, the CPU 201 records information indicating the receipt of the registration request for the existing user, into the history information storing unit 308. The registration request date and time field 501 stores the current date and time. The existing user field 502 stores the value "TRUE". The processing in the flowchart is then ended.

Figure 7:
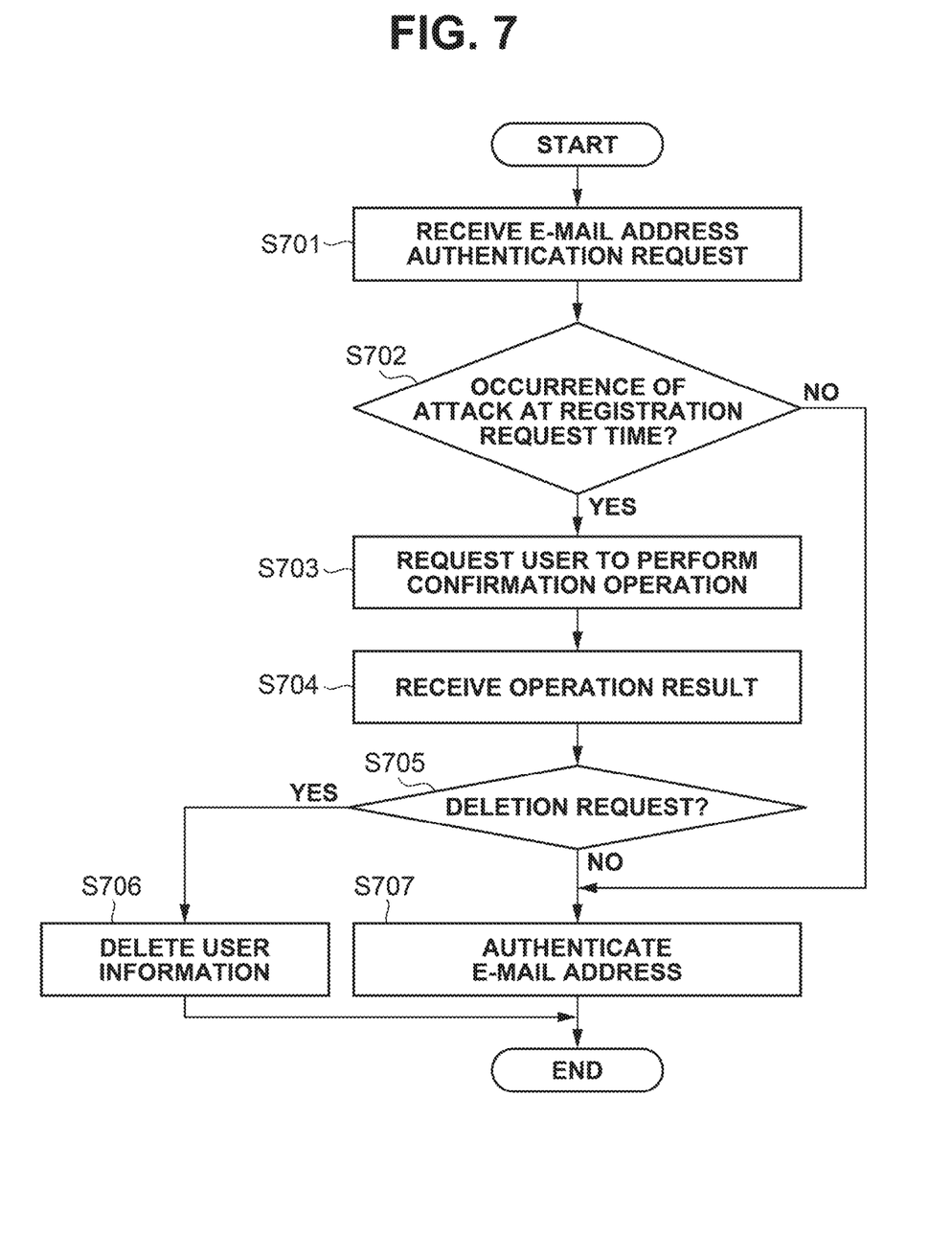
FIG. 7 is a flowchart illustrating another processing performed by the authentication server according to the first exemplary embodiment.

FIG. 7 is a flowchart illustrating processing performed by the authentication server 102 according to the present exemplary embodiment in the case of receiving an e-mail address authentication request.

In step S701, the CPU 201 receives an e-mail address authentication request from the user terminal 104. FIG. 8A illustrates an example of the e-mail address authentication request that is transmitted by the user terminal 104 accessing the URL 801.

The e-mail address authentication request received at this time includes the provisional registration ID in the URL 801.

In step S702, the CPU 201 determines whether an attack occurs at the time of the registration request for the user (the target user) corresponding to the provisional registration ID received in step S701. More specifically, the CPU 201 acquires, from the user information storing unit 307, the record including the provisional registration ID received in step S701 and acquires, from the acquired record, the registration request date and time in the registration request date and time field 406.

The CPU 201 then acquires, from the history information storing unit 308, the records that are made around (e.g., ten minutes before and after) the registration request date and time and determines whether the proportion of registration requests for existing users in all the acquired records is greater than or equal to a threshold. More specifically, the CPU 201 refers to the existing user field 502 to calculate the proportion of records with "TRUE" in all the acquired records and determines whether the calculated value is greater than or equal to the threshold (e.g., 10%). If the calculated value is greater than or equal to the threshold, the CPU 201 determines that an attack occurs at the time of the registration request for the target user (YES in step S702), and the processing proceeds to step S703. If the calculated value is less than the threshold, the CPU 201 determines that an attack does not occur at the time of the registration request for the target user (NO in step S702), the processing proceeds to step S707.

Figure 8B:
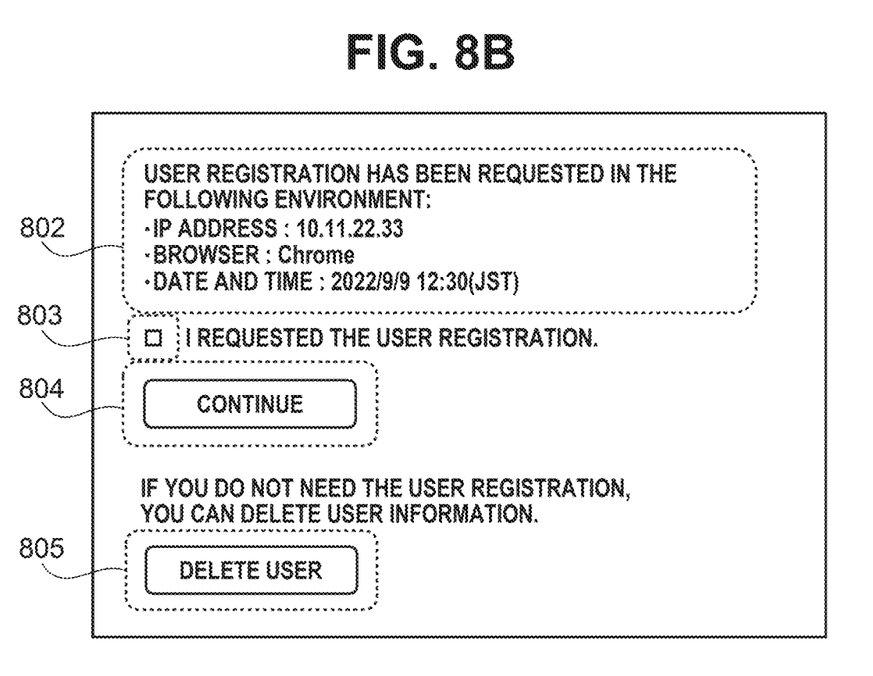

In step S703, the CPU 201 requests the user terminal 104, which is the transmitter of the authentication request received in step S701, to perform a confirmation operation to confirm whether the user himself or herself has made the registration request. FIG. 8B illustrates an example of a screen for requesting the confirmation operation. The screen illustrated in FIG. 8B is displayed on the display 205 of the user terminal 104. In the example of FIG. 8B, access information 802 at the time of the registration request for the user is displayed. The CPU 201 acquires, from the user information storing unit 307, the record including the provisional registration ID received in step S701 and generates the access information 802 using the values of the IP address field 407, the browser field 408, and the registration request date and time field 406 in the acquired record. The CPU 201 displays the access information 802 on the display 205 of the user terminal 104. The CPU 201 presents the access information 802 to the recipient of the identity verification e-mail to prompt the recipient to confirm whether the recipient himself or herself has made the registration request. On the screen illustrated in FIG. 8B, a checkbox 803 for confirming that the user himself or herself has made the registration request, a continue button 804 for issuing an instruction to continue the registration processing, and a user deletion button 805 for issuing an instruction to delete the information of the user corresponding to the registration request are provided. The user terminal 104 receives an operation performed on the screen illustrated in FIG. 8B via the mouse 207 of the user terminal 104, and transmits a result of the operation to the authentication server 102.

In step S704, the CPU 201 receives the operation result from the user terminal 104. In the example of FIG. 8B, if the checkbox 803 is checked and the continue button 804 is pressed, the CPU 201 determines that an instruction is issued to continue the user registration processing. If the user deletion button 805 is pressed, the CPU 201 stops the user registration processing and determines that an instruction is issued to delete the information of the user.

In step S705, the CPU 201 determines whether an instruction is issued to delete the information of the user, based on the operation result received in step S704. If the CPU 201 determines that an instruction is issued to delete the information of the user (YES in step S705), the processing proceeds to step S706. If the CPU 201 determines that an instruction is issued to continue the user registration processing (NO in step S705), the processing proceeds to step S707.

In step S706, the CPU 201 deletes the information of the user in the provisionally registered state without newly registering the user in the provisionally registered state. More specifically, the CPU 201 deletes, from the user information storing unit 307, the record including the provisional registration ID received in step S701. Then, the processing in the flowchart is ended.

In step S707, the CPU 201 authenticates the e-mail address of which authentication is requested in step S701, and newly registers the user in the provisionally registered state. More specifically, the CPU 201 deletes the value of the provisional registration ID field 405 in the record including the provisional registration ID received in step S701. The CPU 201 also notifies the user terminal 104, which is the transmitter of the e-mail address authentication request, that the authentication of the e-mail address is completed.

Figure 8C:
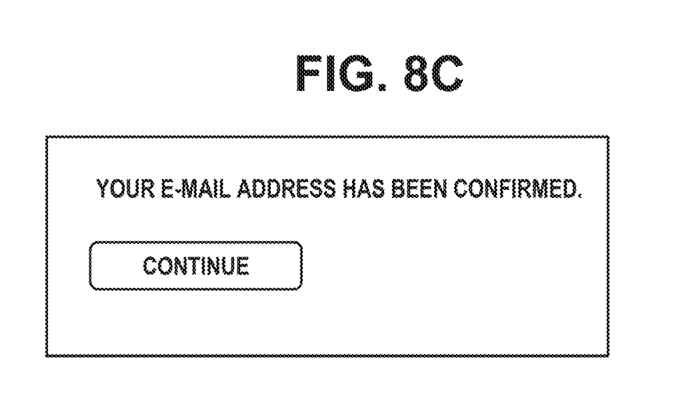

FIG. 8C illustrates an example of a screen for providing the notification that the authentication of the e-mail address is completed. The screen illustrated in FIG. 8C is displayed on the display 205 of the user terminal 104. The processing in the flowchart is then ended.

In the flowchart of FIG. 7, if the CPU 201 determines that an attack occurs at the time of the registration request for the user, the CPU 201 performs control to request the recipient of the identity verification e-mail to perform a confirmation operation to confirm whether the recipient himself or herself has made the registration request. Then, as a result of the operation, if the recipient confirms that the recipient himself or herself has made the registration request and issues an instruction to continue the user registration processing, the CPU 201 authenticates the e-mail address and newly registers the user. As a result of the operation, if the recipient issues an instruction to delete the information of the user, the CPU 201 stops the user registration processing and deletes the information of the user in the provisionally registered state. On the other hand, if the CPU 201 determines that an attack does not occur at the time of the registration request, the CPU 201 performs control not to request the above-described confirmation operation, and authenticates the e-mail address and newly registers the user. In this manner, the CPU 201 performs request control processing to control the request for the above-described confirmation operation.

In step S702 in FIG. 7, the CPU 201 determines whether an attack occurs at the time of the registration request, using the registration request date and time in the history information stored in the history information storing unit 308. However, the present exemplary embodiment is not limited to the method using the registration request date and time. In some embodiments, the CPU 201 acquires, from the history information storing unit 308, the records stored within a predetermined period of time (e.g., ten minutes) from the current date and time, and determines whether the proportion of registration requests for existing users in all the acquired records is greater than or equal to a threshold. If the proportion is greater than or equal to the threshold, the CPU 201 sets an attack flag to ON, and if the proportion is smaller than the threshold, the CPU 201 sets the attack flag to OFF. The CPU 201 regularly performs attack flag setting processing as described above. In step S702, based on whether the attack flag is set to ON, the CPU 201 determines whether an attack occurs at the time of the registration request. Because there is a time lag between the occurrence of an attack and the switching of the attack flag from OFF to ON, the CPU 201 may determine that the attack flag is set to ON for the registration request that is made slightly earlier than the timing at which the attack flag is switched from OFF to ON.

In step S702 in FIG. 7, the CPU 201 determines whether an attack occurs at the time of the registration request, based on the history information stored in the history information storing unit 308. However, the present exemplary embodiment is not limited to the method using the history information stored in the history information storing unit 308. The CPU 201 may regularly perform attack detection using another method and separately store the date and time when an attack is detected. The CPU 201 may then determine the presence or absence of occurrence of an attack at the time of the registration request, by checking the date and time in the registration request date and time field 406 that is acquired from the record including the provisional registration ID against information about the date and time when an attack is detected.

As described above, according to the present exemplary embodiment, regarding a new user registration request that is under attack, the owner of the e-mail address included in the new registration request is requested to perform a confirmation operation to confirm whether the owner himself or herself has made the registration request. Therefore, it is possible to reduce the risk of the user being newly registered due to the owner of the e-mail address opening the link in the identity verification e-mail by mistake. The above-described confirmation operation is requested in a case where an attack occurs, and is not requested in a case where no attack occurs. This suppresses the operation burden on the user.

In the first exemplary embodiment, the example has been described where, if an attack occurs at the time of a user registration request, the owner of the e-mail address is requested to perform a confirmation operation to confirm whether the owner himself or herself has made the registration request. However, if there is a high possibility that the owner of the e-mail address and the requester of the user registration request are the same, the above-described confirmation operation may be omitted. Thus, in a second exemplary embodiment, if it can be determined that the owner of the e-mail address and the requester of the user registration request are the same, the user registration processing is continued without the above-described confirmation operation. In the present exemplary embodiment, components and steps having the same functions as those in the first exemplary embodiment are given the same reference numerals and a description thereof will be omitted.

Figure 9:
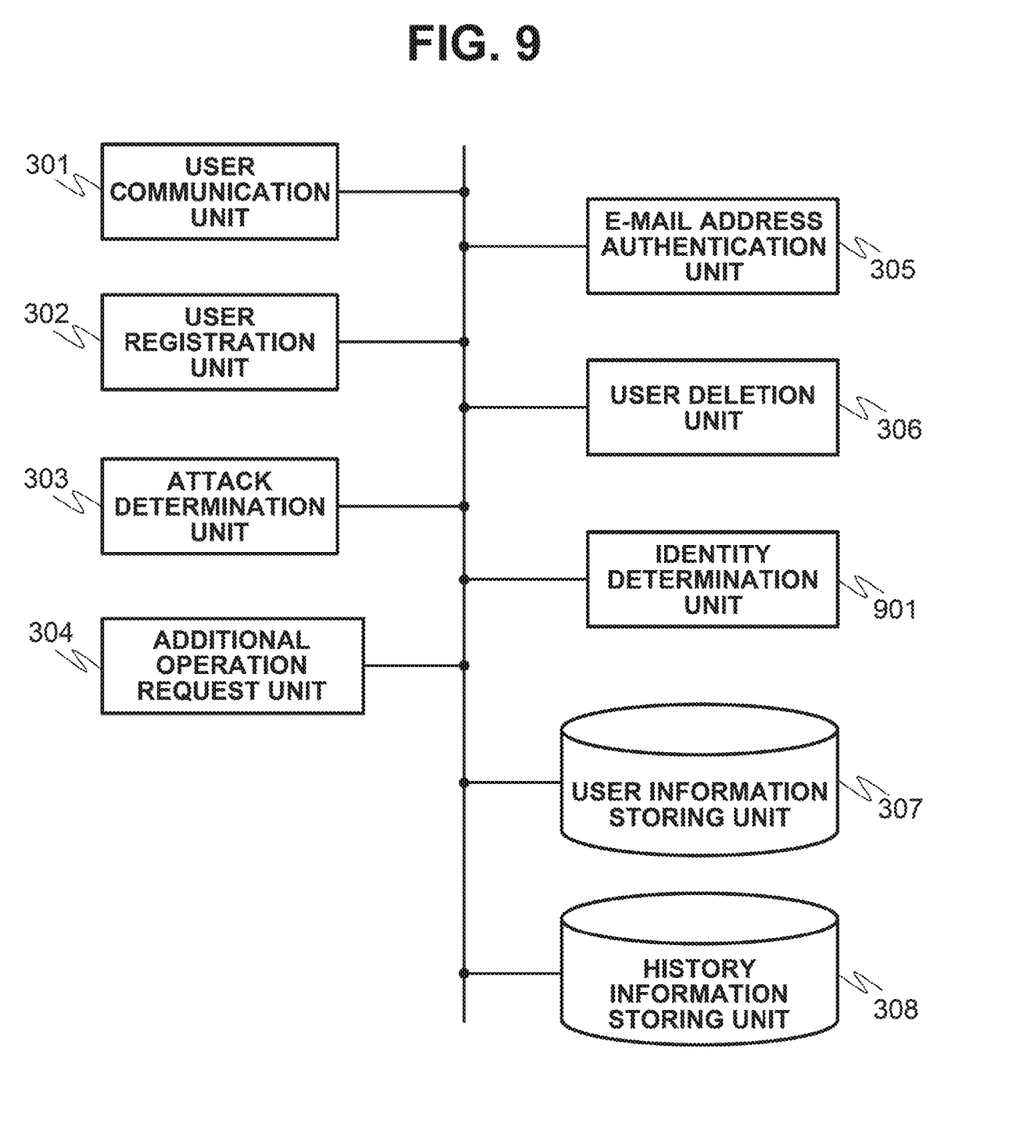
FIG. 9 is a block diagram illustrating an example of a functional configuration of an authentication server according to a second exemplary embodiment.

FIG. 9 is a block diagram illustrating an example of a functional configuration of the authentication server 102 according to the present exemplary embodiment. The functional configuration according to the present exemplary embodiment is different from the functional configuration according to the first exemplary embodiment in that an identity determination unit 901 is added. The identity determination unit 901 determines whether the transmitter of a registration request for an unregistered user and the transmitter of an e-mail address authentication request are the same.

Figure 10:
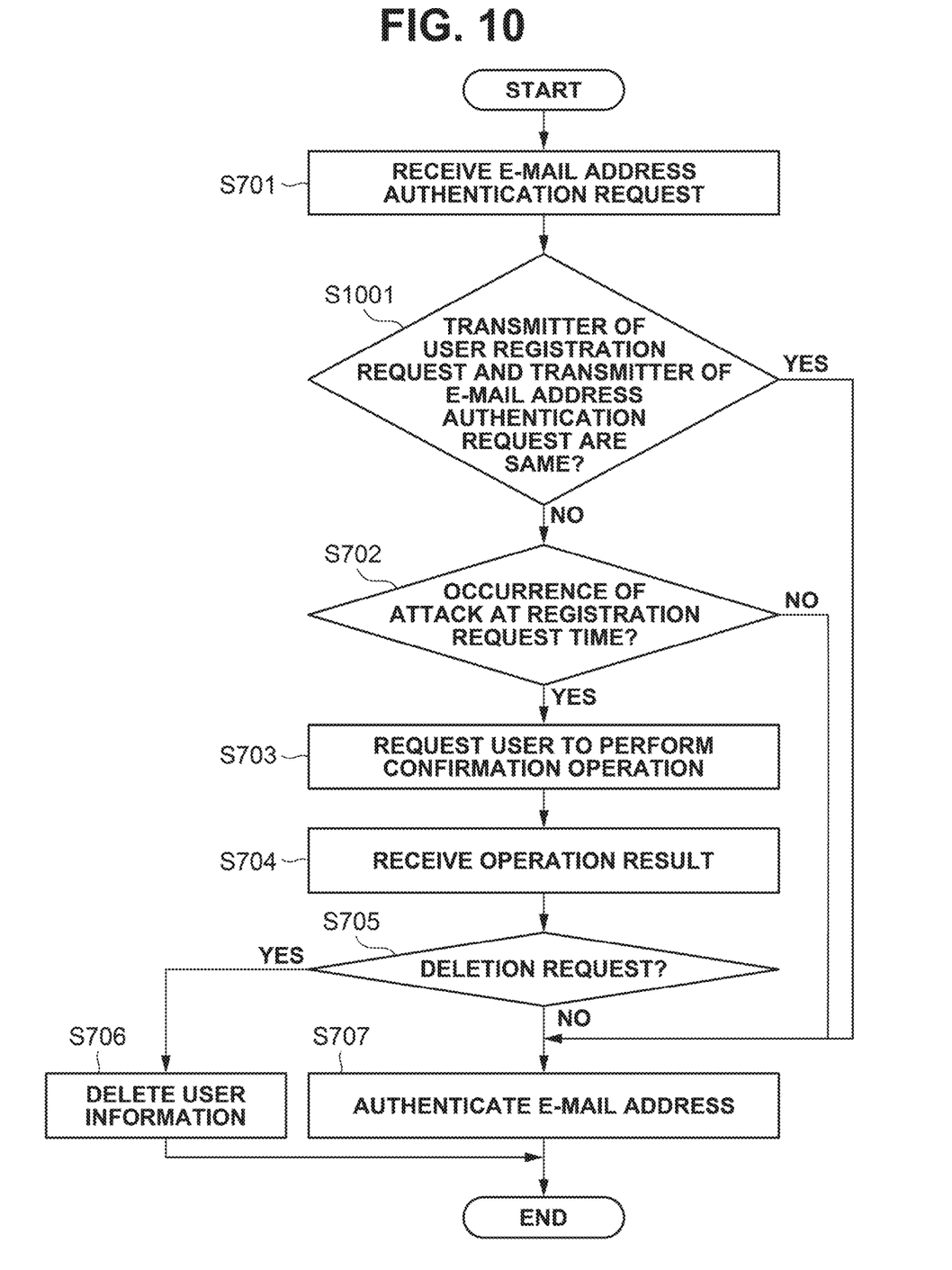
FIG. 10 is a flowchart illustrating processing performed by the authentication server according to the second exemplary embodiment.

FIG. 10 is a flowchart illustrating processing performed by the authentication server 102 according to the present exemplary embodiment in the case of receiving an e-mail address authentication request.

In step S701, the CPU 201 receives an e-mail address authentication request from the user terminal 104. At this time, the CPU 201 acquires information such as the IP address of the user terminal 104, which is the transmitter of the e-mail address authentication request, and the type of browser on the user terminal 104.

In step S1001, the CPU 201 determines whether the transmitter of the registration request for the unregistered user and the transmitter of the e-mail address authentication request are the same. More specifically, the CPU 201 acquires, from the user information storing unit 307, the record including the provisional registration ID received in step S701 and acquires the values of the IP address field 407 and the browser field 408 from the acquired record. The CPU 201 then determines whether the acquired IP address and browser type are the same as those acquired in step S701. If the CPU 201 determines that the IP address and browser type are the same as those acquired in step S701 (YES in step S1001), the CPU 201 determines that the transmitter of the registration request for the unregistered user and the transmitter of the e-mail address authentication request are the same. If the CPU 201 determines that the transmitter of the registration request for the unregistered user and the transmitter of the e-mail address authentication request are the same, the processing proceeds to step S707. In this manner, if it can be determined that the owner of the e-mail address is the same as the requester of the registration request for the unregistered user, the CPU 201 authenticates the e-mail address without requesting the owner of the e-mail address to perform a confirmation operation to confirm whether the owner of the e-mail address himself or herself has made the registration request. If the CPU 201 determines that the transmitter of the registration request for the unregistered user is different from the transmitter of the e-mail address authentication request (NO in step S1001), the processing proceeds to step S702. In this case, there is a possibility that the user registration request is made by an attacker, and thus the CPU 201 requests the owner of the e-mail address to perform a confirmation operation to confirm whether the owner of the e-mail address himself or herself has made the registration request. The method for determining whether the owner of the e-mail address is the same as the requester of the registration request for an unregistered user is not limited thereto, and a method using cookies may be used. In this case, the CPU 201 may store cookies in the browser of the user terminal 104 and determine whether the value of a cookie that is transmitted at the time of transmission of the registration request for an unregistered user is the same as the value of a cookie that is transmitted at the time of transmission of the e-mail address authentication request. The subsequent processing is similar to that in the first exemplary embodiment.

As described above, according to the present exemplary embodiment, if it can be determined that the requester of a new user registration request and the owner of an e-mail address included in the request are the same, it is possible to omit a confirmation operation that is performed by the owner of the e-mail address to confirm whether the owner of the e-mail address himself or herself has made the new registration request. This reduces the operation burden on the user and decreases the complication of the processing procedure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-197983, filed Dec. 12, 2022, which is hereby incorporated by reference herein in its entirety.

What is claimed is:

1. An information processing apparatus comprising:
at least one memory storing programs; and
at least one processor that executes the stored programs, wherein the at least one memory and the at least one processor cooperating to function as:
a first reception unit configured to receive a registration request for a user;
a transmission unit configured to transmit an e-mail including an authentication uniform resource locator (URL) to an e-mail address included in the registration request;
a second reception unit configured to receive an authentication request for the e-mail address, the authentication request being transmitted by access to the authentication URL;
an attack determination unit configured to determine whether the registration request received by the first reception unit is under attack;
a request control unit configured to, in a case where the attack determination unit determines that the registration request received by the first reception unit is under attack, perform control to request a transmitter of the authentication request received by the second reception unit to perform a confirmation operation to confirm whether the transmitter has made the registration request and, in a case where the attack determination unit determines that the registration request received by the first reception unit is not under attack, perform control not to request the confirmation operation; and
a registration unit configured to authenticate the e-mail address corresponding to the authentication request received by the second reception unit and register the user corresponding to the registration request including the e-mail address, wherein, in a case where the request control unit requests the confirmation operation, the registration unit does not register the user based on a result of the confirmation operation.

2. The information processing apparatus according to claim 1, wherein, in a case where the authentication request is received by the second reception unit, the attack determination unit determines whether an attack occurs at a time when the registration request is received by the first reception unit, and wherein the request control unit controls whether to request the confirmation operation, based on a result of the determination by the attack determination unit.

3. The information processing apparatus according to claim 2, wherein the at least one memory and the at least one processor further cooperating to control storing of, as history information, pieces of information indicating whether users corresponding to registration requests, including the registration request, received by the first reception unit are unregistered users or existing registered users, the pieces of information being associated with dates and times when the registration requests are received, wherein the attack determination unit determines whether the attack occurs at the time when the registration request is received, based on the history information corresponding to dates and times around a date and the time when the registration request is received.

4. The information processing apparatus according to claim 3, wherein the attack determination unit determines that the attack occurs at the time when the registration request is received, in a case where, in the history information corresponding to the dates and times around the date and time when the registration request is received, a proportion of pieces of information indicating the existing registered users is greater than or equal to a threshold.

5. The information processing apparatus according to claim 1, wherein, in a case where an operation is performed to issue an instruction to delete information of the user corresponding to the registration request received by the first reception unit, the registration unit deletes the information of the user.

6. The information processing apparatus according to claim 1, wherein, in a case where the request control unit determines that a transmitter of the registration request received by the first reception unit is the same transmitter transmitting the authentication request received by the second reception unit, the request control unit performs control not to request the confirmation operation.

7. The information processing apparatus according to claim 6, wherein the request control unit determines whether the transmitter of the registration request and the transmitter of the authentication request are the same based on at least one of an internet protocol (IP) address, a browser type, and a cookie.

8. The information processing apparatus according to claim 1, wherein, in a case where the request control unit requests the confirmation operation, the request control unit presents information about a transmitter of the registration request to the transmitter of the authentication request.

9. An information processing method comprising:
receiving a registration request for a user;
transmitting an e-mail including an authentication uniform resource locator (URL) to an e-mail address included in the registration request;
receiving an authentication request for the e-mail address, the authentication request being transmitted by access to the authentication URL;
determining whether the received registration request is under attack;

in a case where the received registration request is determined to be under attack, performing control to request a transmitter of the received authentication request to perform a confirmation operation to confirm whether the transmitter has made the registration request and, in a case where the received registration request is determined to be not under attack, performing control not to request the confirmation operation; and authenticating the e-mail address corresponding to the received authentication request and registering the user corresponding to the registration request including the e-mail address, wherein, in a case where the confirmation operation is requested, the user is not registered based on a result of the confirmation operation.

10. A non-transitory computer-readable storage medium storing a program for causing an information processing apparatus to execute an information processing method comprising:

receiving a registration request for a user;

transmitting an e-mail including an authentication uniform resource locator (URL) to an e-mail address included in the registration request;

receiving an authentication request for the e-mail address, the authentication request being transmitted by access to the authentication URL;

determining whether the received registration request is under attack;

in a case where the received registration request is determined to be under attack, performing control to request a transmitter of the received authentication request to perform a confirmation operation to confirm whether the transmitter has made the registration request and, in a case where the received registration request is determined to be not under attack, performing control not to request the confirmation operation; and authenticating the e-mail address corresponding to the received authentication request and registering the user corresponding to the registration request including the e-mail address, wherein, in a case where the confirmation operation is requested, the user is not registered based on a result of the confirmation operation.

* * * * *